April 26, 1960  D. P. BUSHNELL ET AL  2,933,992
COMBINATION BINOCULAR TELESCOPE AND CAMERA
Filed Oct. 6, 1955
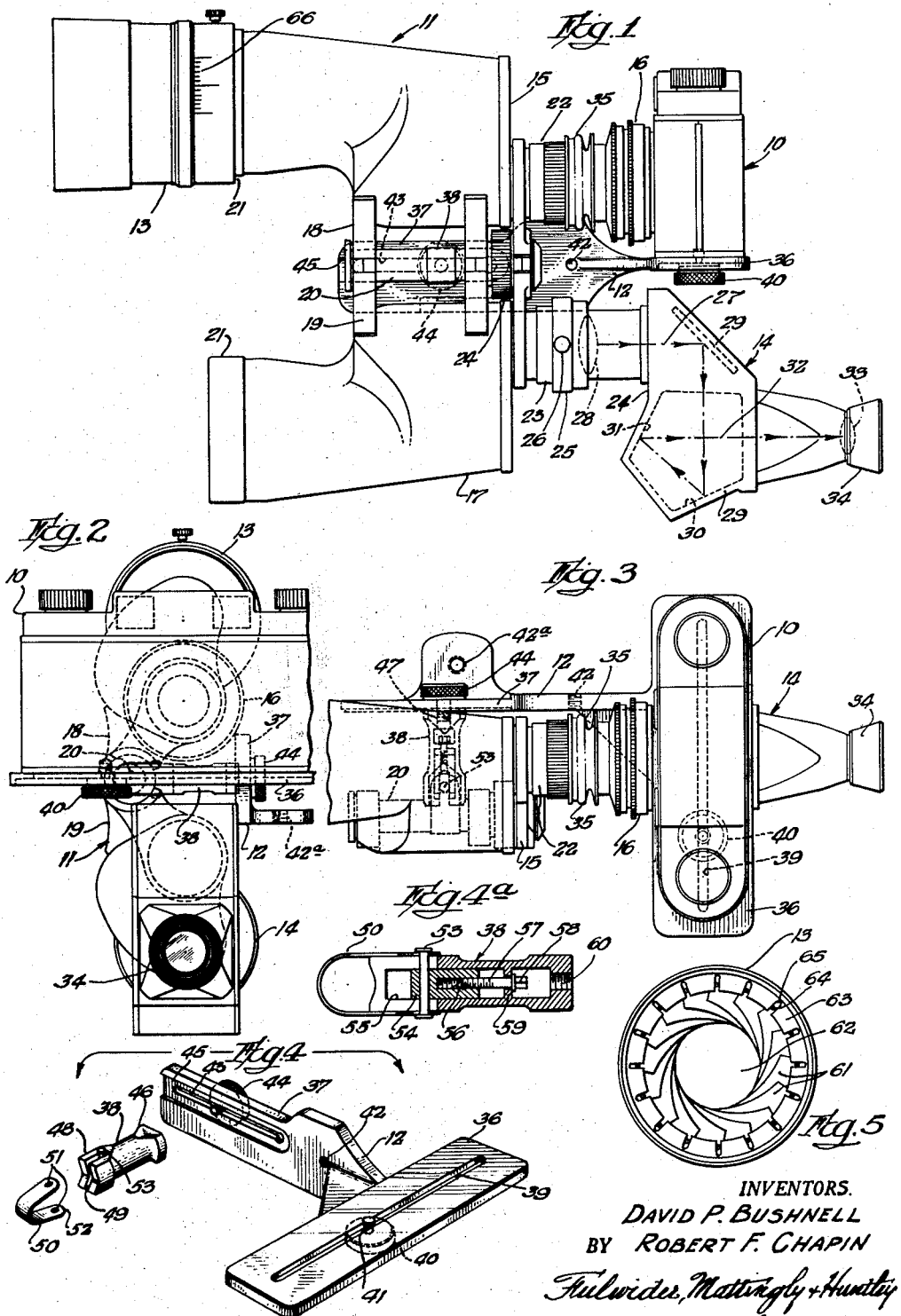
INVENTORS.
DAVID P. BUSHNELL
BY ROBERT F. CHAPIN
Fulwider, Mattingly + Huntley
ATTORNEYS.

pt Office 2,933,992
Patented Apr. 26, 1960

2,933,992

COMBINATION BINOCULAR TELESCOPE AND CAMERA

David P. Bushnell and Robert F. Chapin, Pasadena, Calif., assignors, by direct and mesne assignments, to Bino Specialties, Inc., a corporation of California Application October 6, 1955, Serial No. 538,912

3 Claims. (Cl. 95—12)

This invention relates to telescopic camera systems, and more particularly to a telescopic camera system comprised of a binocular telescope and a camera coupled to one another by means of a coupling bracket assembly permitting adjustment within said telescopic camera system, and ready dismantlement thereof. In its preferred form the telescopic camera system includes in its combination an iris aperture in front of the objective lens of the photographic telescope, and a ground glass viewer on the eye piece of the viewing telescope.

Both amateur and professional photographers seek to extend the range of capabilities of their camera to photograph distant objects, and to achieve portrait effects not otherwise obtainable, by interchanging their standard lenses of medium range focal length with telescopic lenses, usually referred to as telephoto lenses, having much greater focal length than standard lenses and capable of greater magnification of the image, while reducing the field of view. In the past, however, photographers were confronted with substantial expense for additional lenses, or with an insurmountable obstacle because the camera they wished to use was not constructed for the interchange of lenses. Telephoto lenses are not only very expensive, but they are ordinarily designed to couple only to one particular size and one particular make of camera. For example, telephoto lenses for the 35 mm. Exacta cannot be used on the larger Exactas, or on 35 mm. Leicas. The same telephoto lens cannot be employed for 35 mm. camera, 16 mm. motion picture camera, and 2¼ x 2¼ reflex cameras. In general, reflex cameras are not designed to accept telephoto lenses.

It is a major object of the present invention to provide means for coupling a binocular telescope to a camera so that one telescope may be utilized as a telephoto lens, supplementing the camera's regular lens, and the sceond telescope as a focusing and viewing means. Although such devices have been preferred in the past, they have required a specially constructed camera, or binoculars, or both, or have sacrificed the adjustments essential to good photography.

Both cameras and binoculars vary considerably in physical dimensions and the extent of movement of the focusing parts. Heretofore, no telescopic system has been sufficiently flexible in longitudinal, transverse, and vertical adjustments to allow for accommodation of a variety of cameras or binoculars with sufficient adjustment to bring the photographic telescope into alignment and proximity with the camera lens, and the viewing telescope into convenient viewing position.

In previous combinations of binoculars and telescopes no provision was made for relative movement between camera lens and telescope. In the past it has been the practice to focus the camera lens on infinity, and rely on chance. Aperture control at the camera was ineffectual since spherical aberration resulting from the telescopic lens system of the binoculars could not be satisfactorily remedied by adjustment of the camera aperture. Since the eyes of different photographers differ, a binocular telescopic system correctly indexed for one person was not necessarily suited to the eyes of another.

It is therefore an important object of this invention to provide a telescopic camera system which utilizes standard binoculars and cameras, and which allows for relative adjustment in all directions in the coupling between the components.

Another important object is to provide such a system in which the camera may be focused with wide open aperture, focusing and aperture control being thereafter transferred to other parts of the system.

It is another object of this invention to provide a telescopic camera system of the type described in which the aperture of the camera may be opened to its maximum, and stray light excluded by means of an expansible coupling between the lens of the camera and the binocular telescope, control of aperture being achieved by means of an adjustable iris aperture in front of the objective lens of the telescope.

It is a still further object to provide a ground glass eye piece system for focusing said telescopic camera system, so that differences in focusing resulting from differences in the eyes of individual operators are reduced or substantially eliminated.

These and other objects will become apparent from the description of three specific embodiments of the invention illustrated in the accompanying drawings, in which:

Figure 1 is a side elevational view of a telescopic camera system assembly incorporating a standard type of 35 mm. camera;

Figure 2 is an elevational view of the assembly of Figure 1 as seen by the photographer, i.e., from the right of Figure 1;

Figure 3 is a partial plan view of the assembly of Figure 1;

Figure 4 is a perspective view of the coupling bracket and binocular supporting column employed in the assembly of Figures 1, 2, and 3;

Figure 4a is a sectional view of the column;

Figure 5 is a front view of an adjustable iris employed in the assembly of Figures 1, 2, and 3;

Figure 1 illustrates a complete telescopic camera system, including a 35 mm. camera 10, a binocular telescope 11, a coupling bracket 12 for coupling camera 10 to binocular telescope 11, a combination iris and sunshade 13 for controlling the light admitted to camera 10, and a ground glass viewing system 14.

As seen in Figures 2 and 3, the camera 10 is shown as a range finder type of 35 mm. camera, such as the Leica or the Contax. However, the range finder and the viewer play no role in the telescopic system disclosed herein, and the camera 10 might equally well be a single lens reflex camera, such as the Exacta, or might be an inexpensive camera without range finder or viewer. It is not necessary that the camera 10 be of the type in which the lenses are interchangeable, since the binocular telescope in alignment with the camera aperture may serve either as a supplemental lens or as the only camera lens in the system. Most cameras in which the lenses are removable have a focal plane shutter which functions independently of the presence or absence of any lens in the camera aperture. However, an auxiliary shutter might be employed if the camera has no shutter other than that built into its standard lens.

The binocular telescope 11 may be any standard military or sports binoculars of good quality, but preferably modified or augmented as described in connection with the various species of the invention disclosed herein. Also, it is preferred that the binoculars employed be one in which a zinc sulfide coating between the lens elements of the telescopes is used to filter out ultra-violet rays so as to protect the eyes of the user and to give better color rendition in the photographs made with it. Although the two telescopes are substantially identical, they may be distinguished from one another in terms of the use to which they are put. The photographic telescope 15 supplements the lens 16 of the camera 10 and transmits the photographic image to film therein, while the viewing telescope 17 presents the same image (allowing for some parallax) to the eye of the photographer. The telescopes 15 and 17 are coupled to one another by means of hinge mountings 18 and 19 and a hinge pin 20. The objective lenses 21 in the forward ends of the telescopes 15 and 17 are immovably mounted, but the eye pieces 22 and 23 are axially adjustable by means of central focusing screw 24 in order to bring the binocular telescopes into simultaneous focus on the same object. The eye piece 22 on the photographic telescope 15 is independently adjustable so that when the binocular telescopes 11 are used as ordinary binoculars, the two telescopes can be adapted to differences in the eyes of the viewer. It will be understood, of course, that other types of binoculars can be used. For example, a binocular telescope constructed with an independently focusing telescope might also be used in the present invention. In that case, each of the two telescopes is preferably marked to indicate the different focusing positions. The viewing telescope is first focused on the object, and then the photographic telescope is turned until its focus marking is the same as that on the viewing telescope.

Although a standard binoculars may be used, the "seven×50" size being preferred, various modifications of the binocular telescope are desirable.

Most binoculars are made with the eye pieces deeply cut, so that the eye, when positioned against them, is at the proper distance from the eye piece lens. It is preferable, however, that eye pieces 22 and 23 be flat faced so as to fit snugly against camera lens 16 or ground glass viewing attachment 14, respectively. Also, it is desirable that adjustable eye piece 22 be marked to indicate the preferred position for photographic use. Most binoculars are marked with a diopter scale on the adjustable eye piece, and it will usually be found that a diopter scale setting of about —.2 will result in maximum definition of image on film in the camera 10.

The ground glass viewing system 14 is comprised of a standard pentaprism viewer or its equivalent. A housing 24 is recessed at its coupling end 25 to fit over eye piece 23, being snugly attached thereto by tightening holding screw 26. The interior structure of ground glass viewing system 14 is simple and standard in the photographic art. Light beams from the viewing telescope 17 pass in a direction indicated by the dashed line 27 through a lens 28 to a 45 degree angle mirror 29 by means of which the beam is diverted into a typical five-sided glass prism 29, which is mirror coated on surfaces 30 and 31 so as to divert light beam 27 along the line 32 through viewing eye piece lens 33 to the eye piece 34, where the image is beheld by the photographer.

The lens 16 is coupled to the eye piece 22 by means of a light-excluding coupling 35 which is preferably in the form of bellows made of resilient material, such as rubber, so as to permit longitudinal movement of eye piece 22 during focusing. Coupling 35 may be omitted, if the lens 16 and the eye piece 22 are close to each other and light conditions are such that the photographic image is not adversely affected by stray light.

Figure 2 shows the assembly with the right side of camera 10 fractionally broken away, as it is presented to the photographer.

The coupling bracket 12, shown in plan view in Figure 3, and in perspective in Figure 4, is seen to be comprised principally of two elongated rectangular plates disposed at right angles to each other, a camera platform 36, and an arm 37 for supporting the binocular telescope 11, which is adjustably mounted on arm 37 by means of a supporting column 38.

Platform 36 is longitudinally slotted by slot 39, in which a camera attachment screw 40 is slidably held by means of an annular groove 41 at the base of its threaded shank. Camera 10, or any standard 35 mm. camera, may be rigidly attached to the platform 36 at any desired position transverse to the direction in which the camera is pointed, by adjustment along slot 39, and by tightening camera attachment screw 40 into the threaded tripod socket of the camera. The bracket 12 is provided with two internally threaded tripod holes 42 and 42a, which are at right angles to one another so that the entire telescopic camera assembly may be mounted on a tripod in either of two positions.

The arm 37 is also slotted, by longitudinal slot 43 in which an attachment screw 44 is mounted in the same manner that attachment screw 40 was slidably mounted in slot 39. The surface of the arm 37 is grooved with a wide shallow groove 45 extending along the slot 43 and adapted to closely receive the base 46 of the column 38, when the column is assembled in position with the arm 37 by threading the attachment screw 44 into a threaded bore 47 in the base of the column as seen in dashed outline in Figure 3. The slot 43 and the groove 45 make it possible to adjust the position of the column 38 nearer or farther from the camera 10 located on the camera platform 36, so that photographic telescope 15 may be brought into close proximity with the lens 16.

The column 38 is designed to be firmly fastened to hinge pin 20 so as to support the binocular telescopes 11 on coupling bracket 12. Hinge pin 20 seats in a pair of yokes 48, formed in the end of column 38 by a deep longitudinal slot 49. A U-shaped strap 50 clips tightly around hinge pin 20 and holds it snugly on yokes 48 when assembled with column 38. The ends of strap 50 are provided with holes 51 and 52, each of which receives one end of headed pin 53, which is located in slot 49.

The sectional view of column 38 in Figure 4A shows that pin 53 passes transversely through a solid cylinder 54 which slides freely in a longitudinal cylindrical bore 55 within column 38. An internally threaded bore 56 in one end of cylinder 54 receives a tightening screw 57, the head 58 of which seats on an internal annular shoulder 59. Preferably, head 58 is hexagonally recessed to receive a tightening wrench, which may be inserted through bore 60. The bore 60 is internally threaded to receive tightening screw 44. Column 38 is attached to the hinge pin 20 of the binocular telescope 11, prior to mounting on arm 37, by rotating screw 57 until the strap 50 holds the hinge pin 20 tightly in the yokes 48 and 49.

The diaphragm and sunshade attachment 13 is seen in front view in Figure 5. It is a standard iris diaphragm comprised of a plurality of diaphragm blades 61 which reduce aperture 62 when a diaphragm ring 63 is rotated in a counterclockwise direction forcing blade ends 64 to move inwardly in slot 65. Preferably, diaphragm 13 is provided with a graduated scale 66, seen in Figure 1, for setting the aperture at a desired opening.

In operation, it is best to open camera lens 16 to its maximum aperture and focus it at minimum distance. Diaphragm 13 is then adjusted to determine the photographic aperture desired. The larger the aperture, the shorter the exposure time required in a given light. However, if light is ample, a small aperture will be desirable in order to minimize spherical aberration effects on the photographic image, and to increase depth of focus. Photographic telescope 15 and viewing telescope 17 are simultaneously focused on the object to be photographed by means of central focusing screw 24. Although a preferred diopter setting of —.2 has been mentioned for eye piece 22, experience with a particular camera and binoculars may establish some slightly different diopter setting as preferable for a binocular system assembled from those particular components.

Focusing may be accomplished without employing the ground glass viewer 14, by viewing directly at eye piece 23, but if this is done, focus will depend somewhat on eye accommodation of the photographer.

While the specific embodiments of the invention shown and described herein are admirably adapted to fulfill the features of advantage previously enumerated as desirable, it is to be understood that the invention is not to be limited to the specific features shown, but that the means and construction herein disclosed are susceptible of modification in form, proportions, and arrangement of parts, without departing from the principles involved, or sacrificing any of its advantages, and the invention is therefore claimed in embodiments of various forms all coming within the scope of the claims which follow.

We claim:

1. A telescopic camera system which includes: a camera; a center focusing, center hinged binocular telescope having one eye piece independently adjustable; a camera platform adapted to seat against said camera, said platform being slotted transversely to the axis of the lens of said camera, and said platform being slightly bowed with its concave side towards said camera; a camera attachment screw adapted to slide in said transverse slot and to thread into the tripod hole of said camera for attachment to said camera platform; an arm extending from said platform in a line parallel with the axis of said camera lens, said arm having a surface disposed in a plane at right angles to the plane of said camera platform, and said surface being longitudinally recessed and slotted; a supporting column adapted to grip the focusing screw housing of said binocular telescope at one end, and formed at the other end to be received in said longitudinal recess of said arm; a column attaching screw adapted to be longitudinally adjusted along said slot in said recess of said arm, and to rigidly clamp said column into said recess at a selected position the center hinge of said binocular telescope providing adjustment perpendicular to the other two adjustments; and means incorporated in said supporting arm for firmly mounting said telescopic camera system on a camera supporting means.

2. A telescopic camera system as described in claim 1 in which the eye piece of said binocular telescope which is independently adjustable is placed in alignment with the lens of said camera, and an adjustable iris aperture is mounted in front of the objective lens of said aligned telescope.

3. A telescopic camera system as described in claim 2 which includes an expansion bellows of rubber-like material between said aligned eye piece and said camera lens to provide a light seal.

References Cited in the file of this patent

UNITED STATES PATENTS

| | | |
|---|---|---|
| 246,164 | Loiseau | Aug. 23, 1881 |
| 1,161,556 | Watkins | Nov. 23, 1915 |
| 1,835,534 | Steinle | Dec. 8, 1931 |
| 2,290,874 | Graff | July 28, 1942 |
| 2,382,616 | Riccio | Aug. 14, 1945 |
| 2,712,779 | Tolcher | July 12, 1955 |

FOREIGN PATENTS

| | | |
|---|---|---|
| 366,038 | Great Britain | July 23, 1930 |

OTHER REFERENCES

Camera (Switzerland), volume 32, May 1953, pages 206, 208.